R. C. SMITH.
DEVICE FOR GRIPPING.
APPLICATION FILED MAY 5, 1913.
1,138,902.
Patented May 11, 1915.
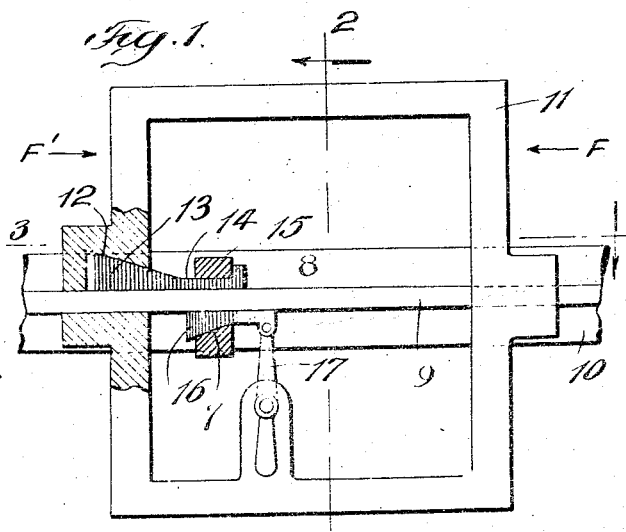
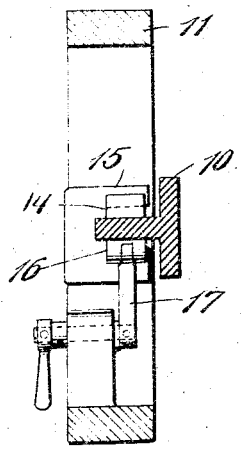
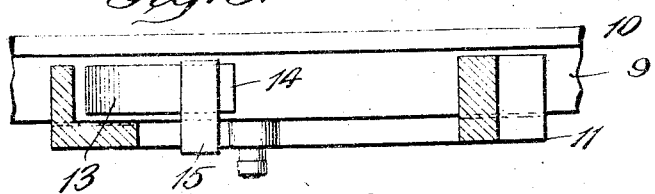
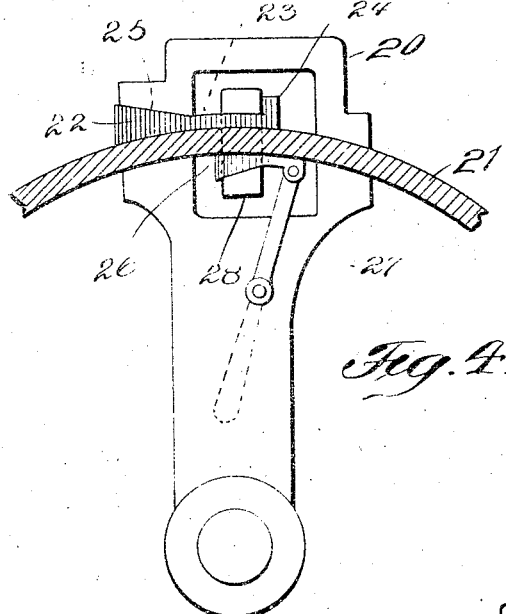
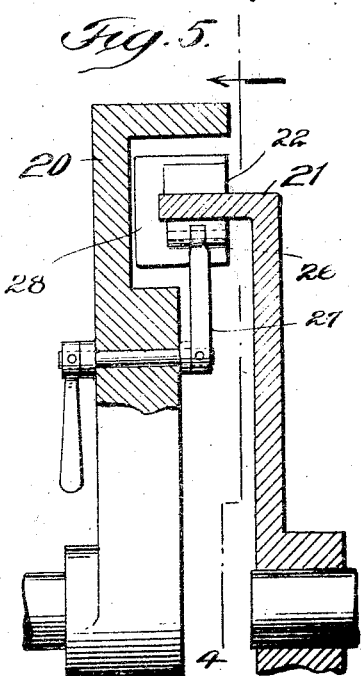
Inventor
Rudolph C. Smith
By his Attorney

UNITED STATES PATENT OFFICE.

RUDOLPH C. SMITH, OF YONKERS, NEW YORK.

DEVICE FOR GRIPPING.

1,138,902.  Specification of Letters Patent.  Patented May 11, 1915.

Application filed May 5, 1913. Serial No. 765,431.

*To all whom it may concern:*

Be it known that I, RUDOLPH C. SMITH, a citizen of the United States, and a resident of Yonkers, in the county of Westchester and State of New York, have invented certain new and useful Improvements in Devices for Gripping, of which the following is a specification.

My invention relates to a new gripping mechanism whereby two members of a structure, one movable on the other or, as an equivalent, both movable with relation to and on each other at different speeds, are acted upon and coupled so as to keep the adhesion between the members equal to the torque between the accelerating and retarding forces to which the members may be subjected and balance automatically in this manner the said forces, whereby the retarding force will counteract the accelerating force of the body in motion and said body will continue in motion with uniform velocity because the retarding and accelerating forces are kept automatically in equilibrium.

The invention will be fully understood from the description hereinafter presented, reference being had to the accompanying drawings, in which:

Figure 1 is a side elevation, partly in section and partly broken away, of a gripping device embodying my invention and in which a movable structure is shown as gripping a stationary member with an adhesion balancing the accelerating force, or whatever torque or force may be applied to the movable member; Fig. 2 is a vertical section of the same on the dotted line 2—2 of Fig. 1; Fig. 3 is a horizontal section of the same on the dotted line 3—3 of Fig. 1; Fig. 4 is a vertical section, taken on the dotted line 4—4 of Fig. 5 through a modified embodiment of my invention, and Fig. 5 is a side elevation, partly in central vertical section, of the same.

I ordinarily make the gripping device as shown in Fig. 1, which illustrates a stationary rail 10 and a frame 11 slidable on and guided by the rail 10. The rail 10 is shown as an ordinary T-rail placed horizontally, and the frame 11 is illustrated diagrammatically as a rectangular frame to which power to move it may be applied for any desired purpose, and said frame 11 is shown as formed at its opposite ends with grooves fitting upon the horizontal member 9 of the said rail, whereby said rail is permitted to serve as a support and guide for said body. The movable frame 11 has at one end at one side of the member 9 of the rail 10 a recess whose outer wall affords a wedge-surface 12. Upon one side of the member 9 is arranged a wedge 13 whose main portion is confined within said recess in said frame 11 and adapted to engage said wedge-surface 12 and which wedge 13 has an extension 14 engaging the member 9 and at the outer end thereof a shoulder 8. Upon the other side of the member 9 and engaging the same is a wedge 16 connected by a link or pivoted lever 17 with the frame 11 and coupled to the extension 14 of the wedge 13 by a U-shaped frame 15, the inner surface of one member of which is wedge-shaped, as at 7, to engage the wedge 16, as shown in Fig. 1, and the inner surface of the other member of which is flat to engage the extension 14 of the wedge 13. The frame or yoke 15 is independent of the frame 11 and capable of a limited sliding movement, and the wedge 16 may be tightened in said frame 15 by power applied to the crank handle of the lever 17, or by any other suitable connection. When the wedge 16 is moved toward the right, in the arrangement shown in Fig. 1, its lower inclined face wedges against the inclined face 7 of the frame 15 and this causes the upper flat face of the said wedge to more firmly engage the member 9 of the beam 10 and the upper member of the frame 15 to more firmly press the lower face of the extension of the upper wedge 13 against said member 9 of the beam 10, with the result that, the body or frame 11 being in motion toward the left, the inclined surface 12 of said body will move into firm engagement with the inclined face of the wedge 13 and that any further acceleration in the movement of the frame 11 will be prevented, this being due to the wedges, which serve as brakes, being compounded and to the consequent balancing of the accelerating and retarding forces (denoted by arrows F, F') acting against the frame or body 11; and the frame or body 11 will under the condition stated continue in motion with uniform velocity since the retarding and accelerating forces remain automatically in equilibrium. The features of my invention establish the correct friction or, as frequently stated, adhesion between the body or frame 11 and the beam 10 to balance the accelerating and retarding forces.

By a great number of experiments I have conceived the structural means to attain the result of always balancing automatically forces F and F'. These forces will balance automatically under all conditions, by compounding wedges 13 and 16, and selecting the angle of the back of the wedges of sufficient inclination to leave the wedges self-releasing.

I have found that a tangent $=1:3$, or more, of the wedge angle, will secure this result for most of the materials used in practical structures, and of course the same automatic result follows for all self-releasing wedges, when the co-efficient of friction between the back of the wedge and the other side of the wedge is practically the same.

Figs. 4 and 5 illustrate the application of my invention to two rotary members of a machine, 20 denoting the accelerating member and 21 the retarding member or vice versa. In Figs. 4 and 5, 22 denotes the upper wedge having an extension 23 and shoulder 24, 25 the inclined surface on the member 20 to engage the inclined face of said wedge, 26 the lower wedge, 27 the lever having a crank handle pivoted to said lower wedge, and 28 the U-shaped frame coupling said wedges.

The operation of the construction shown in Figs. 4 and 5 will be understood from the foregoing explanation of the operation of the mechanism shown in Fig. 1. In both instances the action of the wedges is the same, and in both instances the wedges are self-releasing on a reversal of the movement of the body or bodies in motion.

It is evident that this new mechanism of connecting two members moving at different speeds, by means of friction or adhesion, where the adhesion always balances the accelerating and the retarding force which come into play between the two members connected, is applicable in many arts; clutches for every description of machinery, and the whole field of braking apparatus for railways, all classes of vehicles, and similar retarding apparatus.

I believe my invention to be broadly new and therefore desire adequate protection for the same.

What I claim as my invention and desire to secure by Letters Patent, is:

1. A body, a second body movable under power relatively thereto, and means for establishing plural compound frictional connections in series between said bodies automatically varying to balance part of the accelerating and retarding forces by one connection and the other part by the other, said means comprising compounded plural self-releasing mechanical powers.

2. A body, a second body movable under power relatively thereto, and means for establishing a frictional connection between said bodies automatically varying to balance the accelerating and retarding forces, said means comprising compounded plural self-releasing wedges.

3. A body, a second body movable under power relatively thereto, and means for establishing a frictional connection between said bodies automatically varying to balance the accelerating and retarding forces, said means comprising compounded plural self-releasing wedges carried by the movable body with one wedge on each side of the other body, and a yoke coupling said wedges and having an inclined surface to engage one of them and a plain surface to engage a plain surface of the other wedge, said movable body having an inclined surface to engage the inclined face of said other wedge.

Signed at New York city, in the county of New York and State of New York, this 3d day of May, A. D. 1913.

RUDOLPH C. SMITH.

Witnesses:
ARTHUR MARION,
CHAS. C. GILL.